United States Patent [19]
Imamura et al.

[11] Patent Number: 6,063,332
[45] Date of Patent: *May 16, 2000

[54] HEAT RESISTING METAL FIBER SINTERED BODY

[75] Inventors: Masato Imamura, Tokyo; Kiichi Nakajima, Kokubunji; Akira Yanagisawa, Saitama; Masao Kaneko, Matsudo, all of Japan

[73] Assignee: Sintokogio, Ltd., Aichi, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/719,575

[22] Filed: Sep. 25, 1996

[30] Foreign Application Priority Data

Sep. 25, 1995 [JP] Japan .................................. 7-270488
Aug. 23, 1996 [JP] Japan .................................. 8-241094

[51] Int. Cl.$^7$ ................................ B22F 5/00; B22F 1/00; B21F 45/00; B23P 17/00
[52] U.S. Cl. ................................ 419/4; 419/43; 29/4.51; 29/4.52; 29/419.1; 82/1.11; 83/913
[58] Field of Search ................................ 428/605, 608, 428/903; 29/4.51, 5.52, 419.1; 75/952; 83/913; 82/1.11; 419/4, 43

[56] References Cited

U.S. PATENT DOCUMENTS

| | | | |
|---|---|---|---|
| 3,469,297 | 9/1969 | Webber | 29/180 |
| 3,705,021 | 12/1972 | Sundberg et al. | 29/182.3 |
| 3,727,292 | 4/1973 | Nicely | 29/419 |
| 4,930,199 | 6/1990 | Yanagisawa | 29/4.51 |
| 4,983,467 | 1/1991 | De Bruyne et al. | 428/605 |
| 5,165,899 | 11/1992 | Delaunay et al. | 422/180 |
| 5,525,423 | 6/1996 | Liberman et al. | 428/370 |

OTHER PUBLICATIONS

Neely, John E., Practical Metallurgy and Materials of Industry, John Wiley & Sons, p. 208, 1979.

Primary Examiner—Paul Thibodeau
Assistant Examiner—Holly C. Rickman
Attorney, Agent, or Firm—Michael J. Striker

[57] ABSTRACT

The method of making the metal fiber sintered body includes making a coiled material by coiling a thin sheet of Fe—Cr—Al—La, Fe—Cr—Al—Y or Fe—Cr—Al—Ce stainless steel; making a tow of Fe—Cr—Al—La, Fe—Cr—Al—Y or Fe—Cr—Al—Ce continuous fibers by lathe turning an end face of the coiled material at a tool feed speed of from 5 to 40 $\mu$m/rev; extending the tow in a width direction and cutting the tow with a roller type cutting assembly to form Fe—Cr—Al—La, Fe—Cr—Al—Y or Fe—Cr—Al—Ce stainless steel fibers having a fiber length of 20 to 200 mm; feeding the Fe—Cr—Al—La, Fe—Cr—Al—Y or Fe—Cr—Al—Ce stainless steel fibers having the fiber length of 20 to 200 mm to a conveyor; dropping the stainless steel fibers onto the conveyor and dispersing the stainless steel fibers by making an air current act on the stainless steel fibers; transporting the resulting sheet-shaped accumulation on the conveyor and compressing it to form a web and sintering the web. The stainless steel fibers have a thickness of from 7.5 to 180 $\mu$m, a width of from 10 to 170 $\mu$m and are from 17 to 21% by weight Cr, from 2.5 to 6.5% by weight Al, from 0.02 to 0.25% by weight of La, Y or Ce in addition to their iron content.

12 Claims, 11 Drawing Sheets

Fig. 23-A 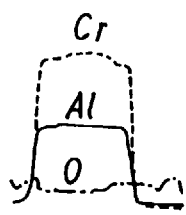
Fig. 23-B 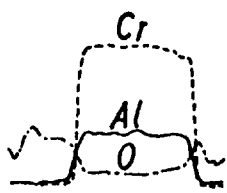
Fig. 23-C 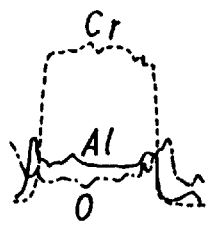
Fig. 23-D 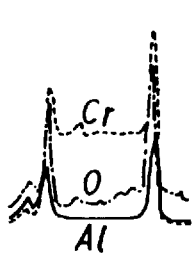
Fig. 23-E 
Fig. 24
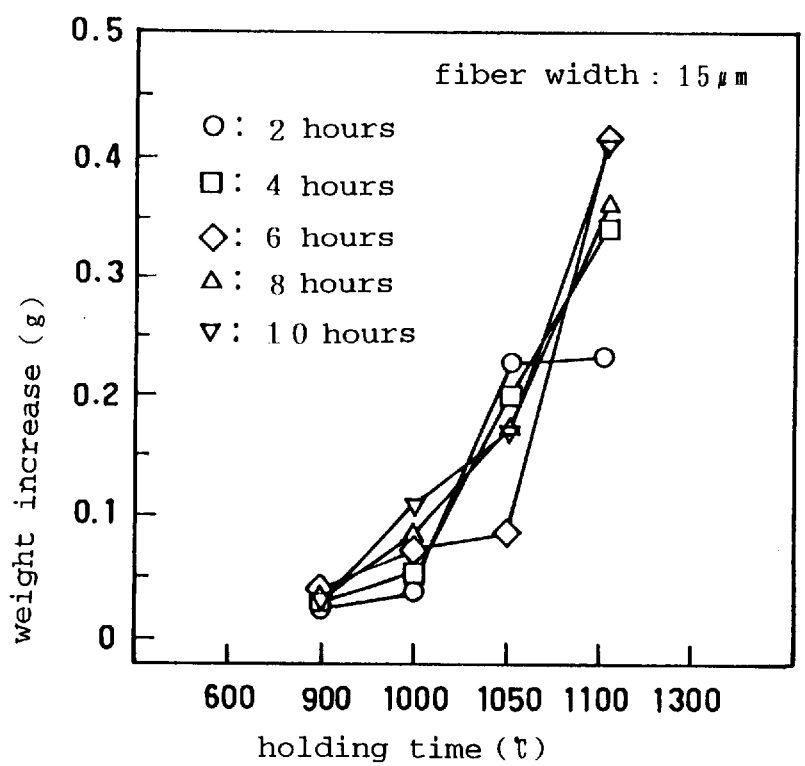

HEAT RESISTING METAL FIBER SINTERED BODY

FIELD OF THE INVENTION

This invention relates to a metal fiber sintered body, and particularly to a metal fiber sintered body having high temperature durability.

BACKGROUND OF THE INVENTION

A metal fiber sintered body is made by thermally sintering a web made by integrating metal fibers (industrially, often manufactured by drawing) of a predetermined length.

This kind of metal fiber sintered body is used in various applications, and among them stainless steel fiber sintered bodies are used in many applications such as filters because they have superior corrosion resistance. In particular, in recent years, in addition to demands for environmental conservation, the use of porous bodies at high temperatures as an energy-saving measure (for thermal efficiency improvement) has come to be demanded, and in this field also stainless steel fiber sintered bodies are being used more and more.

However, because conventional stainless steel fiber sintered bodies have been of material quality SUS304 or SUS316 or the like, about 500° C. has been the highest temperature at which they can be used and there has been the problem that their heat resistance is still not good enough.

As a solution to this, ceramic pressed powder sintered bodies have been used, but although their heat resistance is excellent they have been impractical because of shortcomings such as that their mechanical strength is low, they are brittle and furthermore they are expensive.

SUMMARY OF THE INVENTION

The present invention was devised to solve problems of the kind mentioned above, and a first object of the invention is to provide a heat resisting metal fiber sintered body having good and stable mechanical properties under the conditions of a 500° C. to 1000° C. high temperature air atmosphere.

A second object of the invention is, in addition to the first object, to provide a heat resisting metal fiber sintered body which is damaged little by bending, can be worked into a desired shape to suit an application, has a large surface area, endures outside forces well, and deforms little during high temperature heating.

A heat resisting metal fiber sintered body according to the invention for achieving the above-mentioned first object is characterized in that it is made by integrating to a predetermined thickness and thermally sintering an Fe—Cr—Al—REM stainless steel fiber manufactured by lathe turning an end face of a coil material made by coiling a thin sheet of Fe—Cr—Al—REM stainless steel.

Because Fe—Cr—Al—REM stainless steel is ferritic its machinability is poor and it cannot easily be continuously drawn into a thin wire as in the case of an austenitic stainless steel. That is, it is a difficult material to make into a fiber. Because of this, hitherto, an Fe—Cr—Al—REM stainless steel fiber has in practice not existed, and consequently the manufacture of a fiber sintered body having such a fiber as its starting material has been considered impossible also.

In this connection, the present inventors tried tightly winding a rolled thin sheet of this Fe—Cr—Al—REM stainless steel into a coil and turning an end face of this coil material on a lathe. When they did this, a long fiber of Fe—Cr—Al—REM stainless steel of uniform shape and dimensions was obtained with good yield.

The present invention is based on this discovery, and was arrived at by succeeding in obtaining a heat resisting metal fiber sintered body by using an Fe—Cr—Al—REM stainless steel fiber manufactured by this coil material end face cutting as a starting material and integrating and thermally sintering this starting material.

The composition of an Fe—Cr—Al—REM stainless steel fiber in the invention preferably comprises, by weight ratio, Cr: 17 to 21%, Al: 2.5 to 6.5%, REM: 0.02 to 0.25%.

A more preferable composition is C: up to 0.008%, Si: up to 1.0%, Mn: up to 1.0%, Cr: 19.0 to 21.0%, Al: 4.5 to 6.0%, REM: 0.06 to 0.12% and a remainder of iron and unavoidable impurities.

Also, the above-mentioned Fe—Cr—Al—REM stainless steel fiber preferably is one made by lathe turning an end face of a coil material made by coiling a thin sheet of Fe—Cr—Al—REM stainless steel at a tool feed speed exceeding 5 $\mu$m/rev and preferably at a tool feed speed of 10 to 40 $\mu$m/rev and is a foil-like one whose cross-section perpendicular to the length direction has a rectangular shape or a shape similar to this of width 10 to 170 $\mu$m and thickness 7.5 to 180 $\mu$m.

Fe—Cr—Al—REM stainless steel fibers according to the invention, besides cases where they are straight, include ones of non-straight shape having continuous wavy corrugations. In the case of the latter, because the fibers entangle better, it is possible to make a heat resisting metal fiber sintered body having a uniform Metsuke (weight of fiber per square meter, i.e. density) distribution. Also, it is possible to increase the surface area by means of the corrugations.

A heat resisting metal fiber sintered body according to the invention for achieving the above-mentioned second object is characterized in that as well as being made by integrating to a predetermined thickness and thermally sintering an Fe—Cr—Al—REM stainless steel fiber manufactured by lathe turning an end face of a coil material made by coiling a thin sheet of Fe—Cr—Al—REM stainless steel, the fiber sintered body has wavy corrugations in its thickness direction.

With this construction, even if the cross-sectional area of the fiber (the fiber width×the fiber thickness) is very small the fibers do not readily break when the fiber sintered body is bent and therefore it is possible to curl the fiber sintered body to a small radius and bend it through sharp angles for use. Also, by means of the corrugations it is possible to increase surface area with respect to apparent length, and because when the sintered body is heated to a high temperature its extension is dispersed by the corrugations it is possible to reduce the occurrence of deformation such as swelling. Furthermore, since the contact area per unit plane area increases as a result of the corrugations, even when outside forces act on the fiber sintered body in a direction perpendicular to the corrugations at high temperatures, a good strength sufficient to resist those outside forces is obtained.

A heat resisting metal fiber sintered body according to the invention preferably is made by the following process:
(1) A tow of Fe—Cr—Al—REM stainless steel fibers is made by lathe turning an end face of a coil material made by coiling a thin sheet of Fe—Cr—Al—REM stainless steel.
(2) Long Fe—Cr—Al—REM stainless steel fibers are made by extending in the width direction and cutting the tow of Fe—Cr—Al—REM stainless steel fibers with a roller type cutting assembly.

(3) A sheet-shaped accumulation of fibers is made by causing the Fe—Cr—Al—REM stainless steel fibers immediately after they pass through the roller type cutting assembly to disperse and fall onto a conveyor by making an air current act on the fibers in a direction intersecting with the direction in which the fibers fall, and a web is made by transporting this sheet-shaped accumulation of fibers with the conveyor and compressing it by means of a pressure roller disposed at the exit end of the conveyor.

(4) The web is sintered.

A fiber sintered body for achieving the second object is made by a step of passing the flat sintered body between a pair of toothed rollers being added after the process described above.

Because a heat resisting metal fiber sintered body according to the invention is made of an Fe—Cr—Al—REM stainless steel fiber, in high temperature air its surface becomes coated with chrome oxide $Cr_2O_3$ or alumina $Al_2O_3$.

That is, a durable film is formed by the reaction $$2(Fe, Cr, Al) + 4.5O_2 \rightarrow Fe_2O_3 + Cr_2O_3 + Al_2O_3,$$

at temperatures below 700° C. and by the reaction $Fe_2O_3 + 2Al \rightarrow Al_2O_3 + 2Fe$ at temperatures above 700° C.

Furthermore, because REM (a rare earth metal such as La, Y, Ce) is added to the composition, even if the fiber width (corresponding to the sheet thickness of the coil material) is very fine, at 1 mm or less, the stability of the alumina film at high temperatures is increased. Moreover, because the fiber is made by lathe turning an end surface of a coil material of a fixed thickness, the shape and the dimensions of the fiber are uniform and it is possible to make a metal fiber sintered body having little solidity variation.

Therefore, a heat resisting metal fiber sintered body of the invention can exhibit good porosity and mechanical characteristics in air atmospheres of high temperatures of over 500° C. and up to about 1000° C.

Furthermore, because a heat resisting metal fiber sintered body of the invention has excellent conductivity, there is the merit that a special heat source for temperature holding is not necessary and it is possible to carry out temperature holding by means of heating of the body itself just by passing a current through it directly.

In particular, when the composition is made within the range set forth above, the heat resisting film can be made a certain and stable one. Also, when end face turning is carried out at a tool feed speed exceeding 5 µm/rev, because it is possible to reduce the increase ratio of the fiber width to the tool feed speed, the Fe—Cr—Al—REM stainless steel fiber has excellent tensile strength and by using this it is possible to make a heat resisting metal fiber sintered body having superior strength.

Because it has the superior characteristics at high temperatures described above, a heat resisting metal fiber sintered body according to the invention can be used in the following kinds of application:

[1] Materials and products for filters, such as members for compressed air and gas filters, members for steam filters, and members for liquid (for example water, water solutions, electrolytes, oils, synthetic resin solutions, metal melts) filters.

[2] Materials and products for separation and concentration, such as members for gas (for example mixed gas and gas isotope) separation and concentration, and members for separation and concentration of liquids by for example reverse osmosis.

[3] Materials and products for ventilation, such as members for gas blowing typified by powder transport platforms, aeration (diffusion pipes), air rollers and air bearings, members for gas venting such as breather members, vent members, vacuum leak valves, vacuum chucks, permeable dies and permanent dies, and members for liquid spraying typified by fluid injection electrodes and polishing particle mixture slurry spraying platens.

[4] Materials and products for impact absorption, such as materials for pneumatic machine silencing and sound absorption, interference materials for preventing compressed gas pulsation, anti-vibration materials, compressible elastic bodies, reaction catalyst packing materials and sealing materials, and shock absorbers.

[5] Materials and products using high specific surface area, such as members for chemical reactions typified by catalysts and catalyst carriers, sensors, battery electrode materials, adsorbing materials, heat conducting materials such as quenching materials, heat exchanging elements, and heating elements.

[6] Materials and products using capillarity, such as members for carrying liquids such as water absorbing rollers, flame cones, members for supplying liquids typified by sweat-cooling materials and humidifiers, mist oilers, ink rollers, and bearings.

[7] Materials and products for flow control, such as flow-dividing plates, diffusing plates, or members for controlling gas boundary layers.

Representative preferred embodiments of the invention are described below, but it will be clear to a person skilled in the art that various changes and modifications are possible without deviating from the scope of the invention.

BRIEF DESCRIPTION OF THE DRAWINGS

FIG. 23-A is an EPMA analysis graph of an Fe—Cr—Al—REM stainless steel fiber sintered body of fiber width 50 μm before heat treatment;

FIG. 23-B is an EPMA analysis graph of the Fe—Cr—Al—REM stainless steel fiber sintered body of FIG. 23-A after being heat treated at 600° C.;

FIG. 23-C is an EPMA analysis graph of the same stainless steel fiber sintered body after being heat treated at 900° C.;

FIG. 23-D is an EPMA analysis graph of the same stainless steel fiber sintered body after being heat treated at 1100° C.;

FIG. 23-E is an EPMA analysis graph of the same stainless steel fiber sintered body after being heat treated at 1300° C.; and FIG. 24 is a graph showing the relationship between high temperature holding time and weight increase of a sintered body made using an Fe—Cr—Al—REM stainless steel fiber of fiber width 15 μm.

DESCRIPTION OF THE PREFERRED EMBODIMENTS

Figure 1:
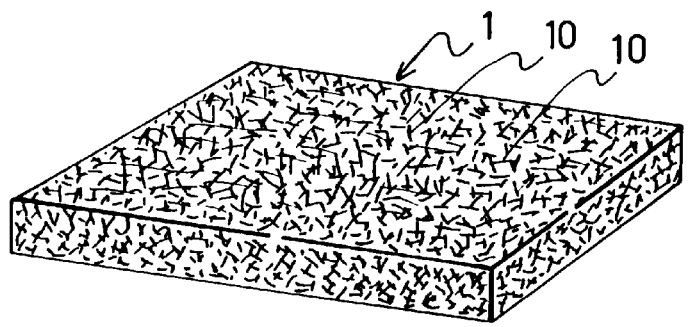
FIG. 1 is a perspective view showing an example of a heat resisting metal fiber sintered body according to the invention.
Figure 2:
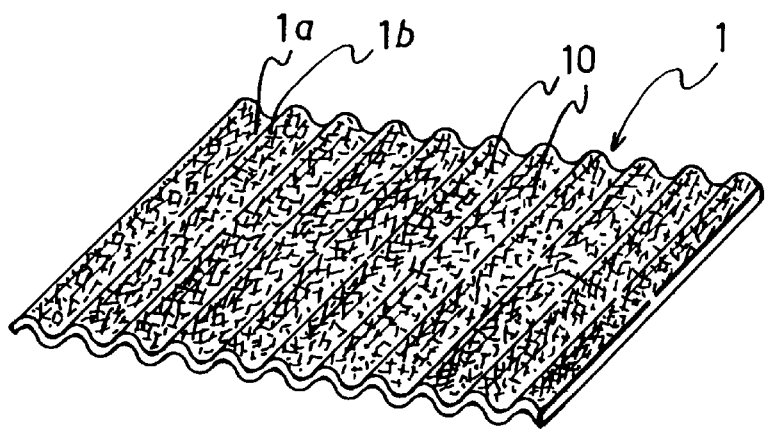
FIG. 2 is a perspective view of another example of a heat resisting metal fiber sintered body according to the invention.
Figure 3:
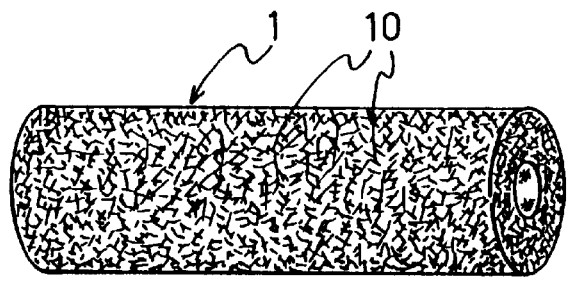
FIG. 3 is a perspective view showing a further example of a heat resisting metal fiber sintered body according to the invention.
Figure 4:
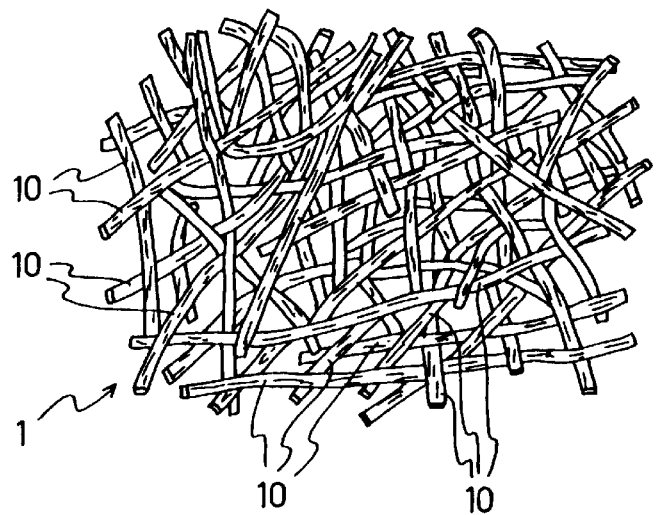
FIG. 4 is a partial enlarged view of a heat resisting metal fiber sintered body according to the invention.
Figure 5:
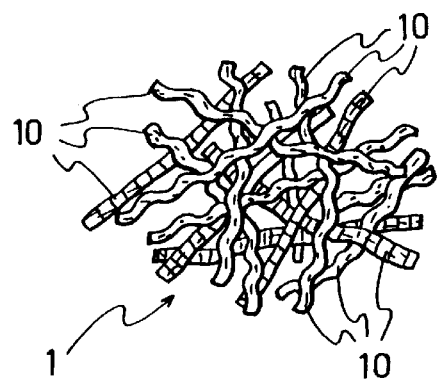
FIG. 5 is a partial enlarged view of a heat resisting metal fiber sintered body according to the invention.

FIG. 1 through FIG. 3 show examples of heat resisting metal fiber sintered bodies according to the invention, and FIG. 4 and FIG. 5 show parts of heat resisting metal fiber sintered bodies according to the invention enlarged.

The reference number 1 denotes a heat resisting metal fiber sintered body; FIG. 1 shows a plate-shaped or block-shaped one and FIG. 2 shows a corrugated one with wavy corrugations 1a, 1b continuously formed therein the thickness direction.

FIG. 3 shows a cylindrical sintered body. This type includes both cylindrical sintered bodies made cylindrical in the web state and then sintered and cylindrical sintered bodies made by rolling and joining the ends of a sintered plate of the shape shown in FIG. 1 or FIG. 2.

The shapes of these heat resisting metal fiber sintered bodies 1 are of course only examples and the invention is not limited to these. The reference number 10 denotes Fe—Cr—Al—REM stainless steel long fibers constituting the heat resisting metal fiber sintered bodies, and contacting parts of these fibers are joined.

FIG. 4 shows a case wherein straight Fe—Cr—Al—REM stainless steel long fibers 10 are used, and FIG. 5 shows a case wherein Fe—Cr—Al—REM stainless steel fibers 10 of a non-straight shape which will be further discussed later are used. In the case of the latter, the three-dimensional entanglement of the fibers is stronger.

So that they will exhibit a heat resisting mechanism based on the above-mentioned formation of heat resisting films, both of these Fe—Cr—Al—REM stainless steel long fibers 10 include as components Cr: 17.0 to 21.0 wt % and Al: 2.5 to 6.0 wt % and also include REM: 0.02 to 0.25 wt %.

With contained amounts of Cr and Al below these lower limits the formation of heat resisting films is insufficient, and with contained amounts exceeding these upper limits the crystal structure of the stainless steel becomes unstable. As the REM, one or more of the elements La, Y and Ce is used. With an added amount less than the lower limit specified above the stability of the oxide film is not increased, and an added amount exceeding the upper limit specified is not appropriate because economy is lost.

A representative and preferable composition is, by weight ratio, C: up to 0.008%, Si: up to 1.0%, Mn: up to 1.0%, Cr: 19.0 to 21.0%, Al: 4.5 to 6.0%, REM: 0.06 to 0.12% and a remainder of iron and unavoidable impurities.

Figure 6:
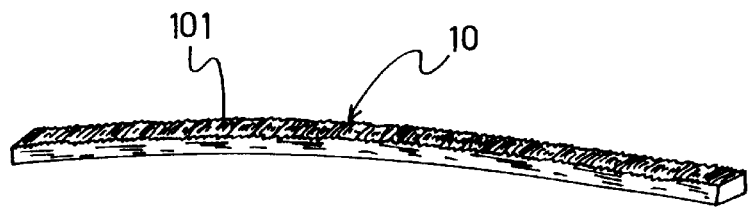
FIG. 6 is an enlarged perspective view showing an example of a heat resisting metal fiber used in the invention.
Figure 7:
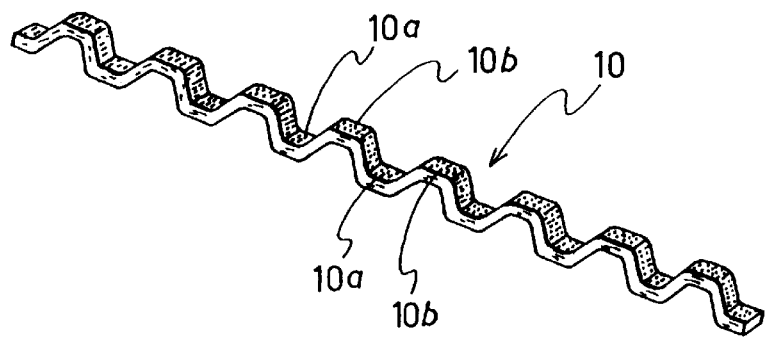
FIG. 7 is a perspective view showing another example of a heat resisting metal fiber used in the invention.

FIG. 6 shows an example of an Fe—Cr—Al—REM stainless steel long fiber 10 according to the invention, and FIG. 7 shows another preferable example of an Fe—Cr—Al—REM stainless steel long fiber 10 of the invention. In FIG. 6, th e Fe—Cr—Al—REM stainless steel long fiber 10 is substantially straight, and in FIG. 7 the Fe—Cr—Al—REM stainless steel long fiber 10 is wavy with corrugations 10a, 10b formed in the thickness direction and repeated in the length direction. The waves are not limited to being trapezoidal and may alternatively be arcuate. In some cases, the waves may be formed in the fiber width direction. This kind of wavy Fe—Cr—Al—REM stainless steel long fiber 10, besides the merit that its surface area is large, has the merit that because the fibers entangle more readily due to the existence of the corrugations 10a, 10b it is possible to form a web having high density and little dispersion of density distribution.

Figure 8:
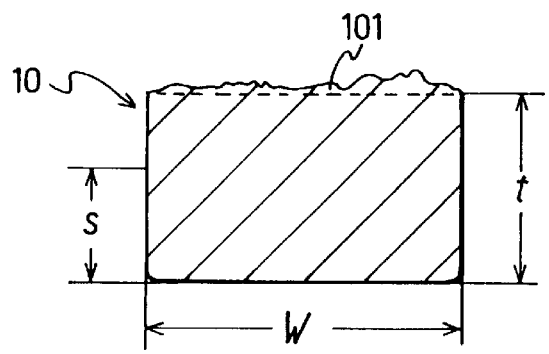
FIG. 8 is an enlarged sectional view of the heat resisting metal fibers shown in FIG. 6 and FIG. 7.

In the case of either fiber shape, the shape of the cross-section of the fiber perpendicular to the axial direction thereof is approximately square, as shown in FIG. 8, and one thickness direction face (the free face, which will be further discussed later) 101 has a rough surface with relatively large irregularities, and the surface area is increased by this.

To obtain good mechanical characteristics at high temperatures, the Fe—Cr—Al—REM stainless steel long fiber 10 is in the range of width W: 10 to 170 μm, thickness t: 7.5 to 180 μm (converted to circle diameter, 10 to 100 μm). Also, to ensure good entanglement of the fibers, a so-called long fiber of 20 to 200 mm in length is preferable. This is because with a short fiber whose aspect ratio is 50 to 100 the entanglement is poor and therefore this cannot be said to be suitable.

A heat resisting metal fiber sintered body 1 of the invention is made by accumulating these Fe—Cr—Al—REM stainless steel long fibers 10 in a desired orientation such as at random or crossed in multiple layers to make a web of Metsuke 150 to 4000 g/m² and then heating this web in a vacuum or in an inert atmosphere at a maximum temperature of 900 to 1300° C. for 10 minutes to 10 hours. During sintering, a load may be applied to the web to increase its density. The invention also includes final products made by heat treating in air at a temperature of 600 to 1100° C. for 2 to 10 hours after sintering.

A process for manufacturing a heat resisting metal fiber sintered body 1 of the invention will now be described in more detail.

Figure 9:
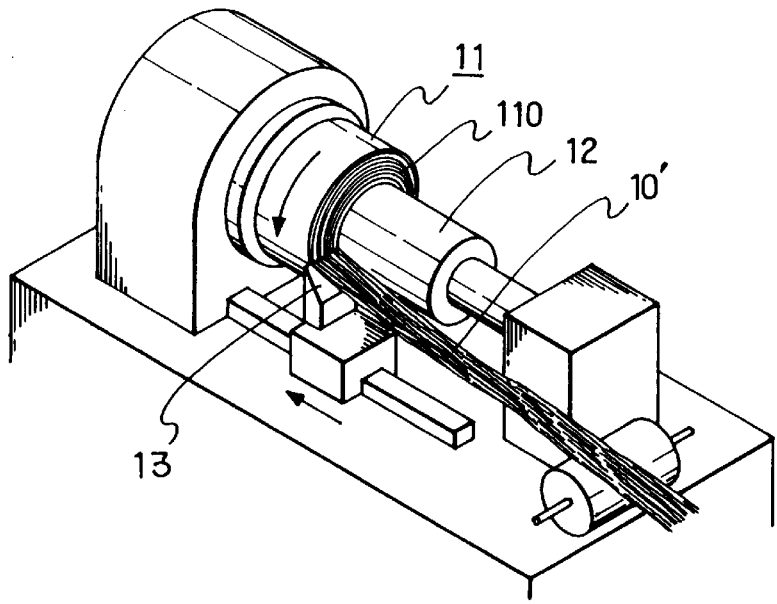
FIG. 9 is a view illustrating the manufacture of a heat resisting metal fiber according to the invention.

FIG. 9 shows a first step for manufacturing an Fe—Cr—Al—REM stainless steel long fiber 10, wherein an Fe—Cr—Al—REM stainless steel thin sheet (foil) 110 of a thickness chosen from for example 10 to 150 μm is tightly wound into a coil on a turning spindle 12, the tip of a cutting tool 13 is brought into contact with an end face of the coil material 11 obtained and a feed parallel with the turning spindle 12 is applied to the cutting tool 13 while the turning spindle 12 is rotated.

In this way, all the layers of the coiled Fe—Cr—Al—REM stainless steel thin sheet 110 are cut simultaneously by the cutting tool 13. As a result, a tow 10' of Fe—Cr—Al—REM stainless steel fibers suitably three-dimensionally curled flows out along the tool rake face rearward without breaking. By extending this tow 10' in the width direction and cutting it to a predetermined length, the Fe—Cr—Al—REM stainless steel long fibers 10 shown in FIG. 6 are obtained.

Generally, metal materials have been made into fibers by the drawing method or the melt spinning method. With the drawing method it is possible to manufacture fibers having of small diameter and having uniform dimensions, but that the cost is high is a fatal problem. With the melt spinning method the materials to which it can be applied are limited and also equipment costs and manufacturing costs are high. With cutting methods wherein a wire material is cut it is not possible to specify the fiber shape and the yield is also poor. A chatter-vibration cutting method is also known, but this is not suitable because it is only possible to manufacture short fibers. The coil material end face cutting method employed in this invention is superior to these methods of making fibers in productivity, fiber uniformity and cost.

In the step shown in FIG. 9, by changing the thickness of the Fe—Cr—Al—REM stainless steel thin sheet 110 and the depth of cut (the tool feed speed), it is possible to manufacture fibers of various dimensions. This is because the fiber width W shown in FIG. 8 of an Fe—Cr—Al—REM stainless steel long fiber 10 of the invention is the same as the sheet thickness of the Fe—Cr—Al—REM stainless steel thin sheet 110 and the fiber thickness t is determined by the tool feed speed s.

Specifically, the conditions of the above-mentioned fiber manufacturing process can be chosen from: tool rake angle: 150 to 45°, cutting speed: 30 to 95 m/min, tool feed speed (s): 5 to 40 μm/min. Among these the most important parameter is the tool feed speed s. This is because the tool feed speed influences the thickness and therefore the strength of the fiber obtained.

That is, the ratio of the fiber thickness t to the tool feed speed s (fiber thickness t/tool feed speed s) is called the increase ratio, and when the tool feed speed is smaller than a fixed value, particularly below 5 μm, the increase ratio shows a tendency to become extremely large. This increase ratio being large means that the material deformation during cutting is large, and because of this notches form in the free face 101 of the fiber and tend to reduce the strength of the fiber. Also, because the fiber thickness cannot be made thin it becomes impossible to obtain a fiber sintered body having high porosity and surface area. Therefore, the tool feed speed s should be made greater than 5 μm/rev and industrially is 8 μm/rev or over.

It is preferable that the Fe—Cr—Al—REM stainless steel long fibers 10 be separate from each other. As a measure to ensure this, preventing the fibers from adhering to each other during lathe turning is effective. A suitable way of doing this is to use a composite thin sheet made by coating the surface of the Fe—Cr—Al—REM stainless steel thin sheet 110 with a film of a water-soluble resin such as polyvinyl alcohol or polyacrylic and drying and solidifying this film before coiling the sheet on the turning spindle. In this case, the tow 10' of Fe—Cr—Al—REM stainless steel fibers obtained by end face turning is immersed in a solvent to remove the water-soluble resin film before being cut to a predetermined length and made into a web.

As the next step, the tow 10' of Fe—Cr—Al—REM stainless steel fibers is cut to make Fe—Cr—Al—REM stainless steel long fibers 10, and these are accumulated to obtain a sheet-shaped or block-shaped web. For this webmaking, it is possible to employ a conventionally used dry method or wet method. However, with these methods there is the problem that as a result of the fact that a step of cutting the long fibers with a blade and a step of dispersing and accumulating those cut fibers are separate and that there is constant wearing of the blade and also that the step of dispersing the fibers is large-scale, equipment costs and metal fiber sheet manufacturing costs are high and the apparatus is large.

Accordingly, in this invention, fiber cutting and webmaking are made continuous using a new method wherein roller cutting and air blowing are employed together.

Figure 10:
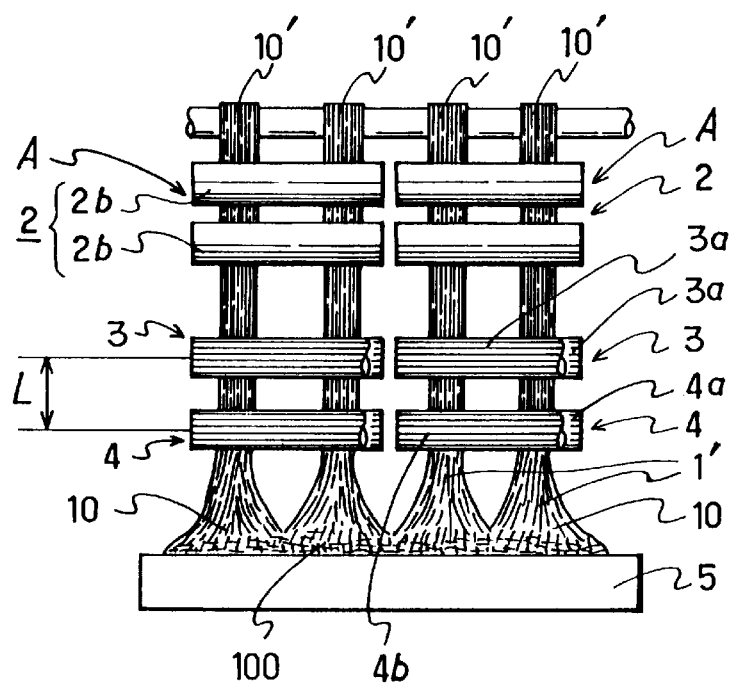
FIG. 10 is a partially cut away front view showing an example of web-making means and a web-making method used in the manufacture of a heat resisting metal fiber of the invention.
Figure 11:
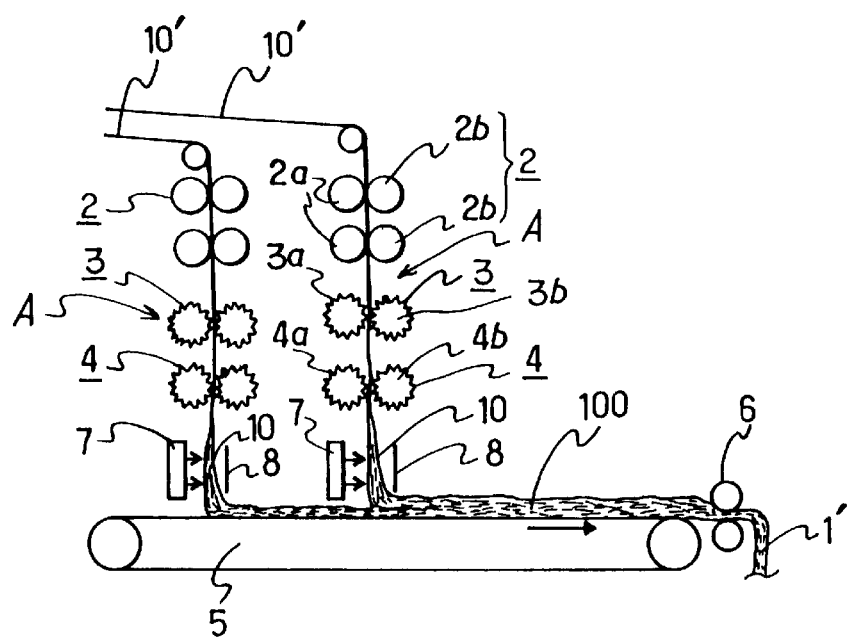
FIG. 11 is a side view showing an example of web-making means and a web-making method used in the manufacture of a heat resisting metal fiber of the invention.

FIG. 10 and FIG. 11 illustrate this method, and show roller type cutting assemblies A disposed in a direction intersecting with the axial direction of tows 10'. A conveyor 5 is disposed below the roller type cutting assemblies A in a direction intersecting therewith, and a web-making means 6 is disposed at the exit end of this conveyor 5. In this example, an upper/lower pair of pressure rollers are used as the web-making means 6. Blowing means 7 such as blowers are disposed between the conveyor 5 and third rollers 4.

Blowing outlets of the blowing means 7 face in the same direction as the direction in which the conveyor 5 moves. Collision plates 8 are disposed facing the blowing means 7 on the other side of the Fe—Cr—Al—REM stainless steel long fibers 10 to make the air currents from the blowing means 7 act effectively.

In this example, two sets of two roller type cutting assemblies A disposed in parallel are disposed one behind the other in the direction of movement of the conveyor 5.

Each of the roller type cutting assemblies A comprises at least three stages of rollers. For example, first stage rollers 2 and second and third stage rollers 3 and 4 disposed downstream of these. Each of these stages of rollers consists of at least one pair of rollers disposed facing each other so as to nip the tow 10' from the front and rear in a direction intersecting with the tow axis. The ends of the rollers are supported by frames not shown in the drawings.

The first stage rollers 2 are for extending the tow in cooperation with the second stage rollers 3, and in this example consist of two sets of a driving roller 2a paired with a following roller 2b. When the fiber width is small, one or more further set of a driving roller 2a and a following roller 2b may be added to the first stage rollers 2 improve the extension of the tow. When the fiber width is large, on the other hand, the first stage rollers 2 may consist of just one set of a driving roller 2a and a following roller 2b. In this case, the following roller may consist of two rollers able to abut with different parts of the driving roller 2a.

The second stage rollers 3 and the third stage rollers 4 are for cutting the tow in cooperation with each other, and are respectively made up of one driving roller 3a, 4a and one following roller 3b, 4b facing this.

Figure 12:
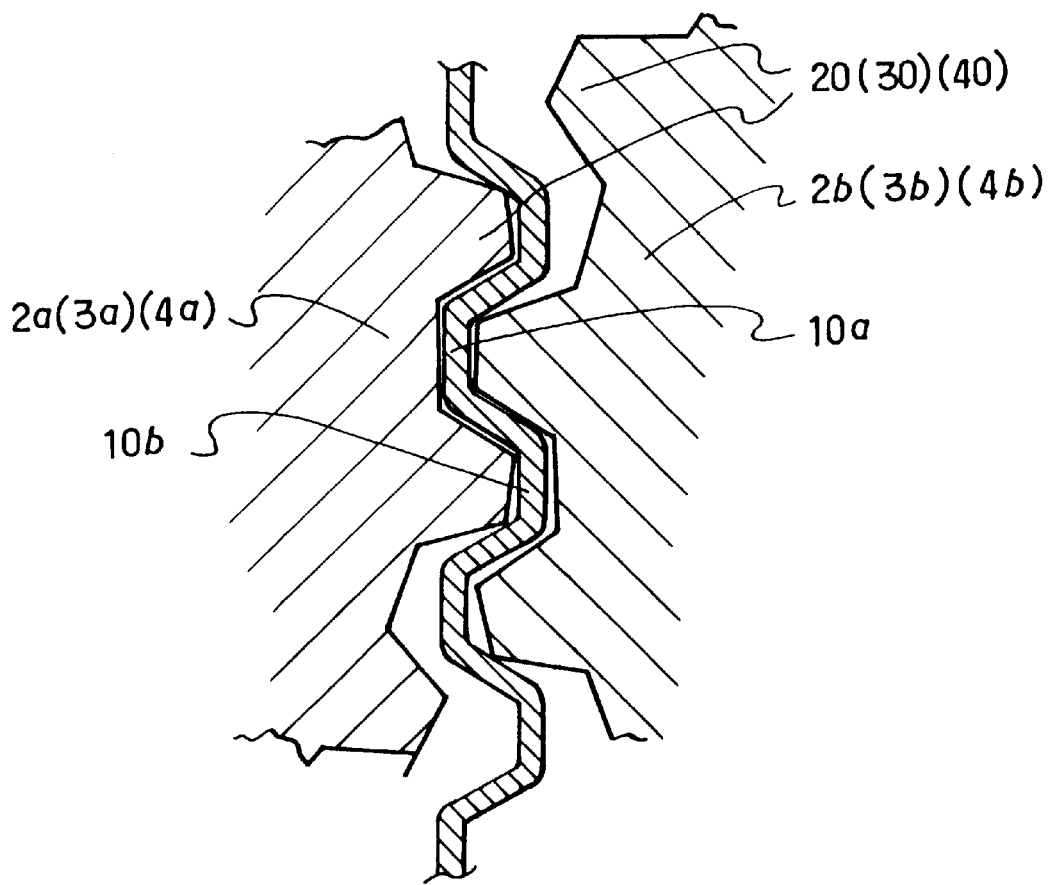
FIG. 12 is a partial enlarged view of FIG. 11.

The driving rollers 2a, 3a and 4a and the following rollers 2b, 3b and 4b may be cylindrical rollers with smooth surfaces. However, preferably, at least the driving rollers 3a and 4a and the following rollers 3b and 4b of the second stage rollers 3 and the third stage rollers 4 are gear rollers or toothed rollers on which are formed mutually meshable tooth parts 30, 40 as shown in FIG. 12.

This is to enable the rollers to grip the tow 10' firmly and cut it in a distance between the roller axes which will be further discussed later. Also, in addition to this, it is to make it possible to obtain the kind of wavy stainless steel long fiber 10 shown in FIG. 7 by corrugations 10a, 10b being continuously worked into the stainless steel long fibers 10 as they are sandwiched in a meshing gap between the tooth parts 30, 40 during cutting. Because when the tooth parts 30, 40 form excessively large corrugations there is a danger of them damaging the fibers, their module is suitably chosen from an appropriate range, for example 1 to 3. In the apparatus shown in the drawings, the first stage rollers 2 are smooth rollers, but when the fiber width is small the first stage rollers 2 also may of course be made toothed rollers.

In fiber cutting and web-making, an Fe—Cr—Al—REM stainless steel tow 10' manufactured with the apparatus of FIG. 9 is guided from a takeup roller not shown in the drawings or as a plurality of bundles directly in parallel from fiber manufacturing apparatuses of the kind shown in FIG. 9 to the first stage rollers 2 and sequentially passed through the rollers downstream. In this state, the speed of rotation of the second stage rollers 3 is made higher than the speed of rotation of the first stage rollers 2. As a result, the Fe—Cr—Al—REM stainless steel tow 10' is stretched. Downstream of this, the third stage rollers 4 are rotated at a speed of rotation higher than the speed of rotation of the second stage rollers 3. As a result, the extended Fe—Cr—Al—REM stainless steel tow 10' is forcibly cut by snapping and Fe—Cr—Al—REM stainless steel long fibers 10 of a predetermined length are simultaneously made in a large quantity and continuously. These Fe—Cr—Al—REM stainless steel long fibers then disperse and drop onto the conveyor 5 moving below the third stage rollers 4.

An air current is blown through the Fe—Cr—Al—REM stainless steel long fibers 10 dropping onto the conveyor 5 from the blowing means 7 in a direction perpendicular to their flow, as shown in FIG. 11. The airflow of the blowing means 7 generally should be 0.5 to 2.0 Nm$^3$/sec. In this way, the Fe—Cr—Al—REM stainless steel long fibers 10 are dispersed before being accumulated on and moved along the conveyor 5. They are then compressed by the web-making means 6 at the front of the conveyor.

The speeds of rotation of the first stage rollers 2, the second stage rollers 3 and the third stage rollers 4 are preferably made such that the relationships between the speed of rotation $V_1$ of the first stage rollers 2, the speed of rotation $V_2$ of the second stage rollers 3 and the speed of rotation $V_3$ of the third stage rollers 4 is $V_1:V_2=1: (1.5$ to $5)$ and $V_2:V_3=1:(5$ to $25)$.

The lower limit of the rotation speed ratio of the second stage rollers 3 was made 1.5 because with a speed ratio less than this it is not possible to obtain the effect of sufficiently stretching or stretching and partly cutting the Fe—Cr—Al—REM stainless steel tow 10', and the upper limit of the speed ratio was made 5 because with a rotation speed difference greater than this almost all of the Fe—Cr—Al—REM stainless steel tow 10' is snapped and not passed on to the third stage rollers 4. The lower limit of the speed ratio of the second stage rollers 3 to the third stage rollers 4 was made 5 because with less than this it is not possible to perform complete cutting by snapping, and the upper limit of the speed ratio was made 25 because when the snapping speed is too great the cut Fe—Cr—Al—REM stainless steel long fibers 10 scatter too far and do not accumulate on the conveyor 5 at the desired Metsuke or get wound on the rollers.

When the first stage rollers 2 consist of a plurality of sets, the rollers of these sets may rotate at the same speed or alternatively their speeds of rotation may become faster the further downstream they are. For example, the speed of rotation of downstream rollers can be suitably made about 5 to 30% faster than the speed of rotation of upstream rollers. The speed of rotation $V_1$ of the first stage rollers is determined using that of downstream rollers as a reference.

Because the first stage rollers 2 act as pinch rollers due to the rotation speed ratio between the first stage rollers 2 and the second stage rollers 3, the Fe—Cr—Al—REM stainless steel tow 10' is clamped by the first stage rollers 2, and as a result of the faster rotation of the second stage rollers 3 is suitably stretched in the axial direction while between the first stage rollers 2 and the second stage rollers 3.

The Fe—Cr—Al—REM stainless steel tow 10' is then sent from the second stage rollers 3 to the third stage rollers 4, but the difference between the speeds of rotation of the second stage rollers 3 and the third stage rollers 4 is large. Consequently, in this stage the second stage rollers 3 work as pinch rollers and clamp the Fe—Cr—Al—REM stainless steel tow 10' while the rapidly rotating third stage rollers 4 pull the tow 10' strongly. As a result, the Fe—Cr—Al—REM stainless steel tow 10' stretched in the first stage undergoes a sudden pulling and is forcibly snapped.

Because the rotation speed ratio of the second stage rollers 3 to the first stage rollers 2 is relatively small, curls in the Fe—Cr—Al—REM stainless steel tow 10' are straightened and strength reduction due to cracks forming in brittle parts is accelerated so that certain and uniform cutting is subsequently achieved by the third stage rollers 4. Some cutting is also carried out of parts sufficiently pinched by the pulling action of the second stage rollers 3.

The cut fiber length basically is the distance L between the axes of the second stage rollers 3 and the third stage rollers 4, and by setting this distance L it is possible to freely obtain Fe—Cr—Al—REM stainless steel long fibers of from a relatively small length such as 20 mm to a relatively long length exceeding 100 mm.

Since the Fe—Cr—Al—REM stainless steel long fibers thus cut fall freely while being dispersed by centrifugal force created by the rapid rotation of the third stage rollers 4, they are scattered on the conveyor 5 with random orientation as a sheet-shaped fiber accumulation 100.

Furthermore, if the blowing means 7 disposed between the third stage rollers 4 and the conveyor 5 are operated, because the Fe—Cr—Al—REM stainless steel long fibers 10 are dispersed by an air current from a direction intersecting with the direction in which they are falling and also are blown forward and collide with the collision plates 8 and then fall freely, they are uniformly dispersed.

When gear rollers of the kind shown in FIG. 12 are used as the rollers, Fe—Cr—Al—REM stainless steel long fibers 10 having the kind of continuous corrugations 10*a*, 10*b* shown in FIG. 7 fall from the third stage rollers 4 and are scattered onto the conveyor 5 by the air blowers. As a result the fibers entangle well with each other due to the corrugations 10*a*, 10*b* and form a highly dense sheet-shaped fiber accumulation 100. Also, the sides of the sheet-shaped fiber accumulation 100 are thereby prevented from becoming thin.

Because of this, compared to a case wherein rollers having smooth surfaces are used, the dispersion in the Metsuke distribution can be reduced by at least ±5% and up to as much as ±10%. For example, when there was Metsuke dispersion of 20% when smooth rollers were used, by using toothed rollers it is possible to make the dispersion 10% and the precision of the Metsuke distribution can be made high.

The thickness of the sheet-shaped fiber accumulation 100 is adjusted freely by adjusting the speed of movement of the conveyor 5, and when the sheet-shaped fiber accumulation 100 reaches the exit of the conveyor 5 it is compressed in its thickness direction by the pressure rollers constituting the web-making means 6 and becomes a web 1'. This web 1' is taken up on a takeup roller and later fed out from this and cut or cut and then worked into a desired shape. It is then loaded into a sintering furnace and thermally sintered under no load or with a load applied to it. Alternatively, the web 1' can be sintered as a long continuous web by being fed into a continuous sintering apparatus, for example a tunnel sintering furnace or a direct resistance heating type heating apparatus, installed immediately downstream of the web-making means 6. With a direct resistance heating type heating apparatus it is possible to make use of the merit that the Fe—Cr—Al—REM stainless steel long fibers 10 have good electrical conductivity.

When at least two roller type cutting assemblies A, A are disposed in series in the carrying direction of the conveyor as shown in FIG. 11, a required number of Fe—Cr—Al—REM stainless steel tows 10', 10' are fed into each of the cutting assemblies A, A and cut by being snapped and dispersed and simultaneously dropped onto the conveyor 5. Because as a result of this on top of the sheet-shaped fiber accumulation 100 from farthest upstream are scattered and accumulated the Fe—Cr—Al—REM stainless steel long fibers made by the cutting assemblies A downstream of that, it is possible to obtain a web having a high Metsuke with good efficiency.

When the kinds of fiber manufacturing method and web-making method described above are employed, it is possible to make an Fe—Cr—Al—REM stainless steel fiber web of random orientation from an Fe—Cr—Al—REM stainless steel thin sheet continuously and with good efficiency and cheaply, and by feeding this web directly or after being cut into a sintering furnace it is possible to cheaply mass-produce a heat resisting metal fiber sintered body having excellent high temperature characteristics.

Figure 13:
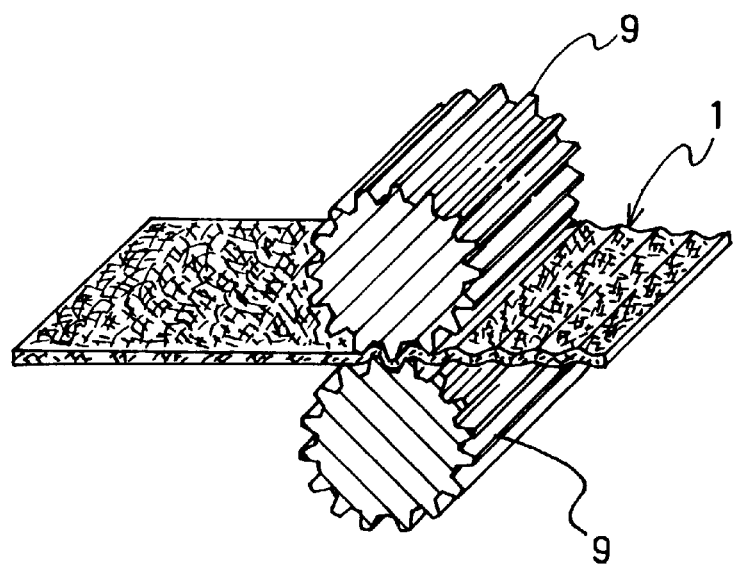
FIG. 13 is a perspective view showing a method of manufacturing the heat resisting metal fiber sintered body shown in FIG. 2.

To obtain a corrugated heat resisting metal fiber sintered body 1 of the kind shown in FIG. 2 in which wavy corrugations 1*a*, 1*b* are continuously formed in the thickness direction, using a pair of toothed rollers 9, 9 corrugations are formed by passing a flat heat resisting metal fiber sintered body 1 of the kind shown in FIG. 1 through the toothed rollers 9, 9 as shown in FIG. 13. The teeth of the toothed rollers 9, 9 preferably do not have edges like those of an involute gear but are rounded teeth having curvature. This process may be carried out cold or may be carried out warm.

In either case, because a heat resisting metal fiber sintered body 1 of this invention is made by cutting an end surface of a coil material 11 of an Fe—Cr—Al—REM stainless steel thin sheet 110 to make long fibers and then making these into a web and sintering the web, a stable durable oxide film is formed on the heat resisting metal fiber sintered body 1 when it is heated to a high temperature in an air atmosphere and ample durability is maintained in a range of high temperatures up to 1000° C.

EXAMPLES

Preferred embodiments of the invention will now be described.

First Preferred Embodiment

1) The invention was used to obtain fiber sintered bodies for filter use of width 300 mm×length 500 mm and different thicknesses in the range 0.7 mm to 2.0mm.

As the material of the sintered bodies, an Fe—Cr—Al—REM stainless steel thin sheet of the following composition (wt %) was used:

C: 0.004%, Si: 0.14%, Mn: 0.13%, Cr: 20.02%, Al: 4.9%, La: 0.08% and a remainder of iron and unavoidable impurities.

Fe—Cr—Al—REM stainless steel thin sheets of seven different sheet thicknesses, 10 $\mu$m, 15 $\mu$m, 20 $\mu$m, 25 $\mu$m, 35 $\mu$m, 50 $\mu$m and 135 $\mu$m were used. The thin sheet of sheet thickness 50 $\mu$m was unannealed. The tensile strength of the base metal, in the case of the 50 $\mu$m sheet, because this was unannealed, was 875 to 1056 MPa depending on the cross-head speed, and in the case of the 135 $\mu$m thick sheet was substantially fixed at 600 MPa.

The thin sheets were each tightly wound into a coil on a turning spindle, and an end face of the coil material was continuously cut with a cutter to make fibers.

The Fe—Cr—Al—REM stainless steel tow obtained by this process was cut to produce long fibers, these long fibers were integrated to make a web of Metsuke 1200 g/m$^2$, and a stainless steel fiber sintered body was obtained by sintering this web in a vacuum atmosphere having its partial pressure controlled with an inert gas at 1120 to 1160° C. for 2 hours.

2) Cutting of the Fe—Cr—Al—REM stainless steel tow and Metsuke and web-making were carried out by the roller cutting and air blowing method. Two Fe—Cr—Al—REM stainless steel tows were used and the roller gap was made 80 mm.

Cutting and Metsuke and web-making were carried out with the following conditions on Fe—Cr—Al—REM stainless steel tows made using thin sheets of sheet thickness 50 $\mu$m and 135 $\mu$m as starting materials.

Driving rollers and following rollers 70 mm in diameter and having smooth surfaces were used as the rollers of a roller type cutting assembly. As the first stage rollers, two sets of rollers were disposed upstream/downstream of each other, the speed of rotation of the upstream rollers was made 23 rpm and the speed of rotation of the downstream rollers was made 28 rpm. The speed of rotation of the second stage rollers was made 56 rpm and the speed of rotation of the third stage rollers was made 580 rpm, the distance L between the second stage rollers and the third stage rollers was set to 80 mm, the speed of the belt conveyor was adjusted in the range 1 to 6 m/min and pressure rollers were disposed at the exit of the belt conveyor. Air was blown from a blower of outlet area 33 cm$^2$ at an airflow of 0.9 Nm$^3$/sec.

As a result, Fe—Cr—Al—REM stainless steel fibers of fiber length approximately 90 mm were scattered from the third stage rollers in a random orientation and a web of a Metsuke substantially uniform in the width direction was obtained. Because a fixed thickness (in practice corresponding to the fiber width) of the thin sheet coil material was cut at a fixed feed rate (in practice corresponding to the fiber thickness), the stainless steel long fiber had a cross-section shown in FIG. 8 perpendicular to the length direction having an approximately rectangular shape and its overall shape was the straight shape shown in FIG. 6.

3) Also, for the cutting and web-making of Fe—Cr—Al—REM stainless steel tows made using thin sheets of sheet thicknesses 10 $\mu$m, 15 $\mu$m, 20 $\mu$m, 25 $\mu$m and 35 $\mu$m, as a roller type cutting assembly, toothed rollers of diameter 30 mm and provided with teeth of module 2 around their peripheries were used, two sets of rollers were disposed upstream/downstream of each other as the first stage rollers and the distance between the axes of the second stage rollers and the third stage rollers was set to 45 mm. The speeds of rotation of the rollers and the conveyor speed were the same as above.

As a result, Fe—Cr—Al—REM stainless steel long fibers of fiber length below 40 mm and rectangular in cross-section and of a shape wherein roughly trapezoidal corrugations 2 mm in height are repeated as shown in FIG. 7 were scattered from the third stage rollers in a random orientation and a web having a very uniform Metsuke distribution was obtained. This was because the entanglement of the stainless steel long fibers was improved by the corrugations.

4) After measuring the dimensions of the manufactured fibers, the tensile strengths of single fibers were measured.

Figure 14:
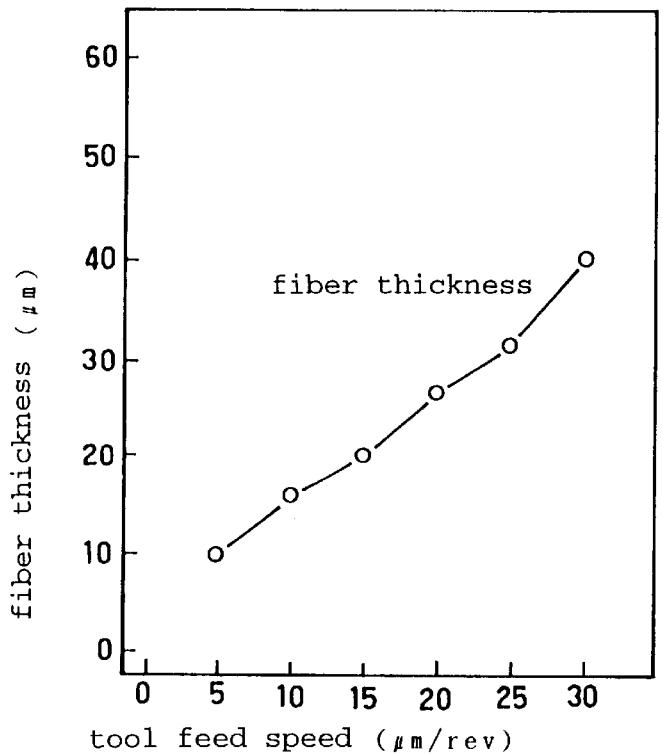
FIG. 14 is a graph showing the relationship between the tool feed speed and the fiber thickness in a case wherein an Fe—Cr—Al—REM stainless steel thin sheet of sheet thickness 50 μm was used as the starting material.
Figure 15:
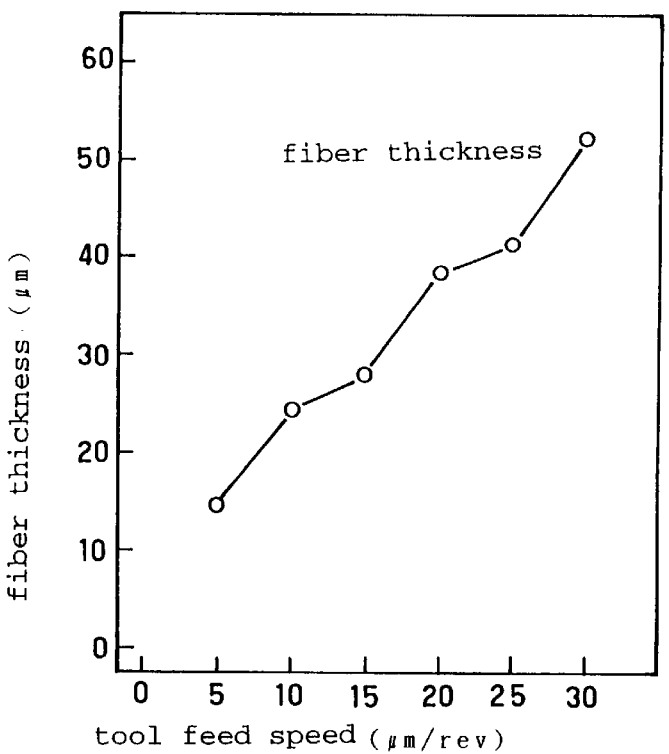
FIG. 15 is a graph showing the relationship between the tool feed speed and the fiber thickness in a case wherein an Fe—Cr—Al—REM stainless steel thin sheet of sheet thickness 135 μm was used as the starting material.

FIG. 14 shows results obtained when in the case of a thin sheet of thickness 50 $\mu$m the tool feed speed was changed and the resulting changes in the thickness of the fibers manufactured were measured. FIG. 15 shows results obtained when in the case of a thin sheet of thickness 135 $\mu$m the tool feed speed was changed and the resulting changes in the thickness of the fibers manufactured were measured.

The fiber thickness had been assumed to be proportional to the tool feed speed, but showed a tendency to increase disproportionally when the tool feed speed fell below a certain level. Experimental values of increase ratios (fiber thickness/tool feed speed) including those for fibers below 50 $\mu$m are shown summarized in FIG. 16.

Figure 16:
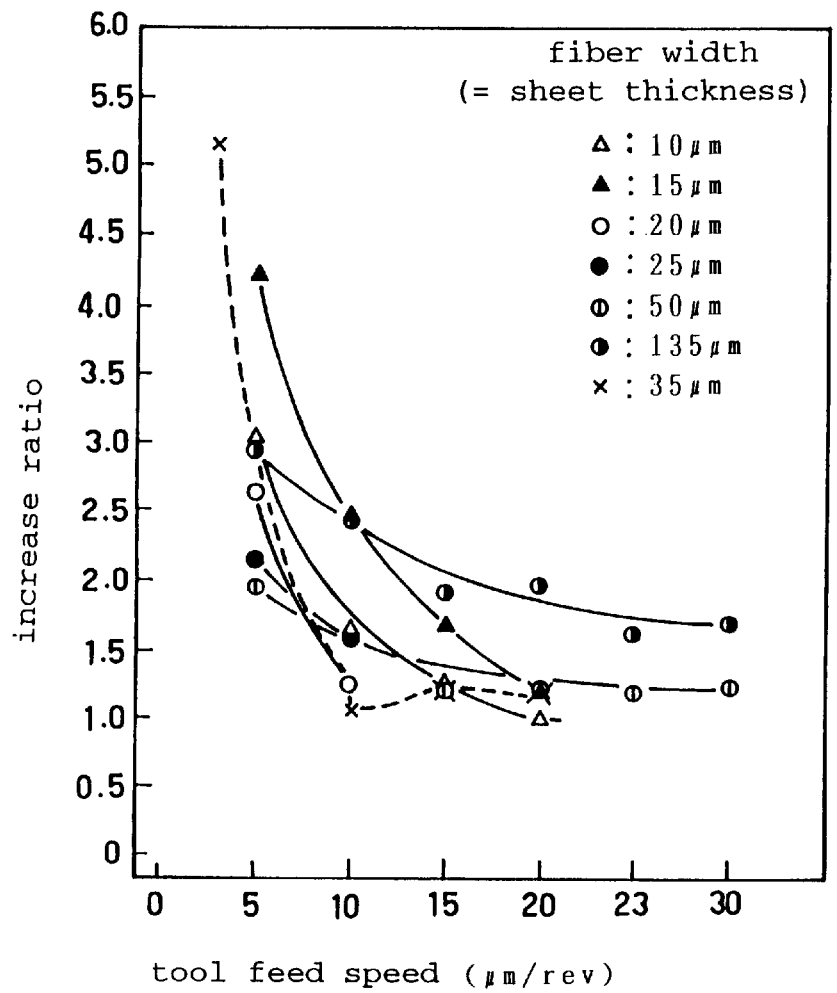
FIG. 16 is a graph showing the relationship (increase ratio) between the tool feed speed and the fiber thickness for cases wherein Fe—Cr—Al—REM stainless steel thin sheets of different sheet thicknesses were used as the starting material.

As is clear from FIG. 16, although when the tool feed speed is over 15 $\mu$m/rev the increase ratio shows a stable value of 2.0 to 1.0, when the tool feed speed becomes lower than this the increase ratio rapidly becomes large and when the tool feed speed is small, at 5 $\mu$m/rev, the increase ratio is extremely large.

The reason why the increase ratio becomes large like this when the tool feed speed becomes small is thought to be that because the contacting portion of the tool making contact with the material being cut changes depending on the tool feed speed, the influence of roundness (the included angle) of the cutting edge of the tool appears greatly and the area of contact with the edge becomes large and the net shear angle becomes small.

The fiber length of the manufactured Fe—Cr—Al—REM stainless steel long fibers was on average 16 $\mu$m (converted to circle diameter, 34 $\mu$m) in the case of a thin sheet of sheet thickness 50 $\mu$m and a tool feed speed of 10 $\mu$m/rev. In the case of a thin sheet of sheet thickness 135 $\mu$m and a tool feed of speed 10 $\mu$m/rev, the fiber thickness was on average 24 $\mu$m (converted to circle diameter, 70 $\mu$m). In the case of a thin sheet of sheet thickness 15 $\mu$m and a tool feed speed of 10 $\mu$m/rev, the fiber thickness was on average 13 $\mu$m (converted to circle diameter, 16 $\mu$m).

Figure 17:
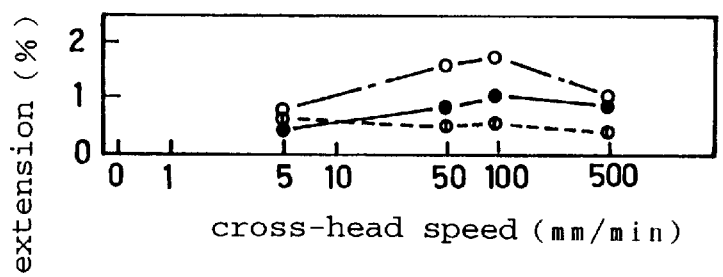
FIG. 17 is a graph showing the relationship between crosshead speed and extension in tensile testing of Fe—Cr—Al—REM stainless steel fibers manufactured with different tool feed speeds.
Figure 18:
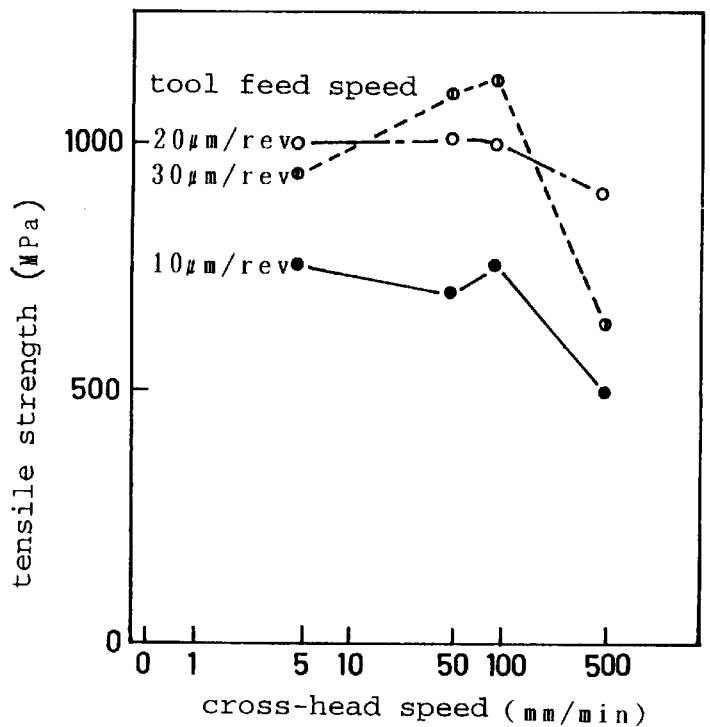
FIG. 18 is a graph showing the relationship between crosshead speed and tensile strength in tensile testing of Fe—Cr—Al—REM stainless steel fibers manufactured with different tool feed speeds.

5) Next, the extensions and tensile strengths of three Fe—Cr—Al—REM stainless steel fibers manufactured by end face turning a coiled thin sheet of sheet thickness 50 $\mu$m at tool feed speeds of 10 $\mu$m/rev, 20 $\mu$m/rev and 30 $\mu$m/rev are shown in FIG. 17 and FIG. 18.

When the crosshead speed, i.e. the holder movement speed in the tensile test was 5 mm/min, the tensile strength of the Fe—Cr—Al—REM stainless steel long fiber manufactured with a tool feed speed of 20 $\mu$m/rev was 995 MPa and in the case of the tool feed speed of 30 $\mu$m/rev was 942 MPa, and tensile strengths as good as that of the base metal were thus obtained. The tensile strength of the Fe—Cr—Al—REM stainless steel long fiber manufactured with a tool feed speed of 10 $\mu$m/rev was 759 MPa, which is about 300 MPa lower than that of the base metal, but even with this tensile strength the fiber is amply usable.

Figure 19:
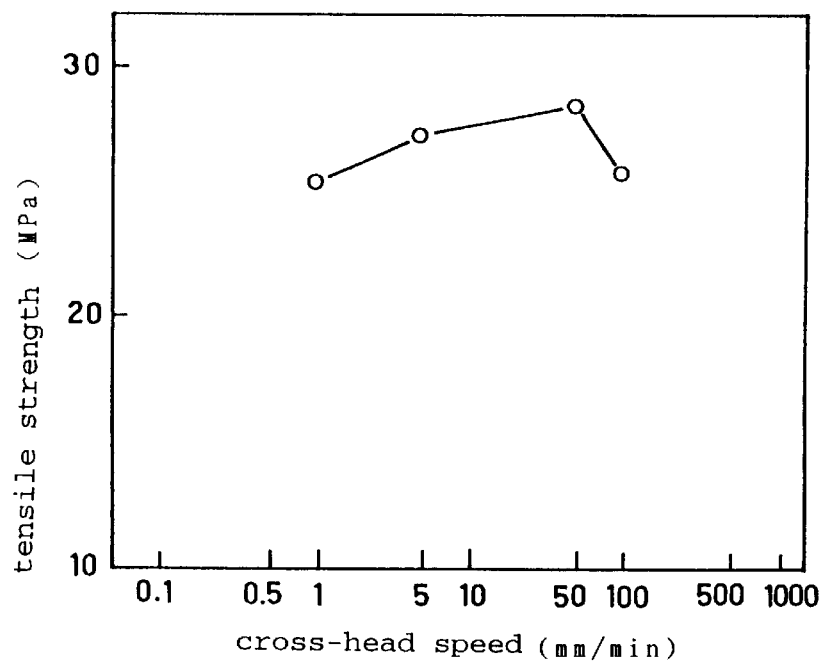
FIG. 19 is a graph showing the relationship between crosshead speed and tensile strength of an Fe—Cr—Al—REM stainless steel fiber of fiber width 50 μm.
Figure 20:
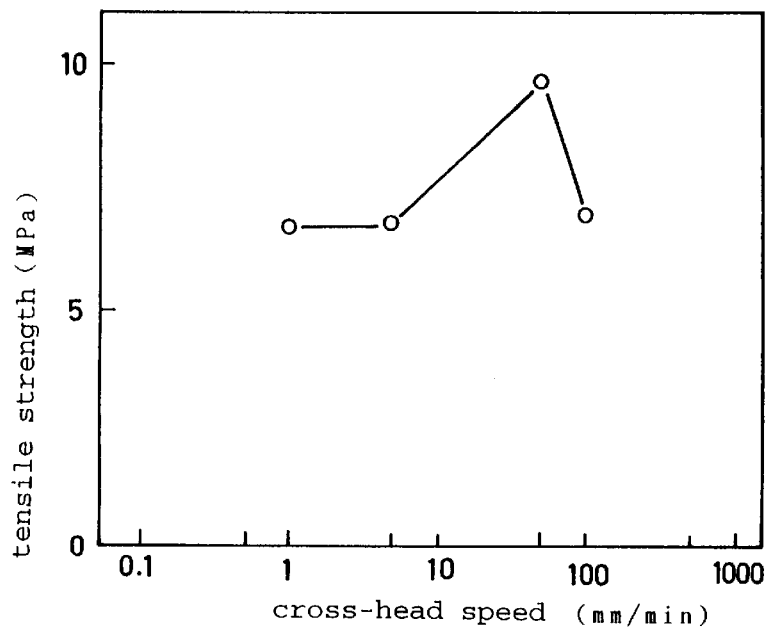
FIG. 20 is a graph showing the relationship between crosshead speed and tensile strength of an Fe—Cr—Al—REM stainless steel fiber of fiber width 135 μm.

6) Next, results obtained when the extension and tensile strength of an Fe—Cr—Al—REM stainless steel fiber sintered body according to the invention were measured are shown in FIG. 19 and FIG. 20. The thickness of this stainless steel fiber sintered body is 0.7 mm.

FIG. 19 shows the case of an Fe—Cr—Al—REM stainless steel long fiber manufactured using a thin sheet of sheet thickness 50 $\mu$m and a tool feed speed of 10 $\mu$m, and FIG. 20 shows the case of an Fe—Cr—Al—REM stainless steel long fiber manufactured using a thin sheet of sheet thickness 135 $\mu$m and a tool feed speed of 10 $\mu$m.

In the case of the former sintered body, because the porosity ratio is about 78%, with respect to the base metal's tensile strength of 1056 MPa (with a crosshead speed of 5 mm/min), the tensile strength of the sintered body was 27 MPa, and in the case of the latter, because the porosity ratio was about 84%, the tensile strength was 6 to 7 MPa.

This is thought to be that the strength showed an apparently low value because as in the case of a porous sintered body the strength of a stainless steel fiber sintered body of the invention depends on the porosity ratio. This was confirmed by the fact that base material tensile strength data obtained by extrapolating measured values to porosity ratio zero were in substantially the same range as SUS316 and SUS304 and the like.

7) Next, an experiment to ascertain the usable temperature range of a stainless steel fiber sintered body according to the invention was carried out. This was done by measuring the change in weight of a stainless steel fiber sintered body manufactured using an Fe—Cr—Al—REM stainless steel long fiber manufactured from a thin sheet of sheet thickness 50 $\mu$m with a tool feed speed of 10 $\mu$m/rev when it was heat treated in an air atmosphere at 600 to 1300° C. for 2 to 10 hours. The results are shown in FIG. 21.

Figure 21:
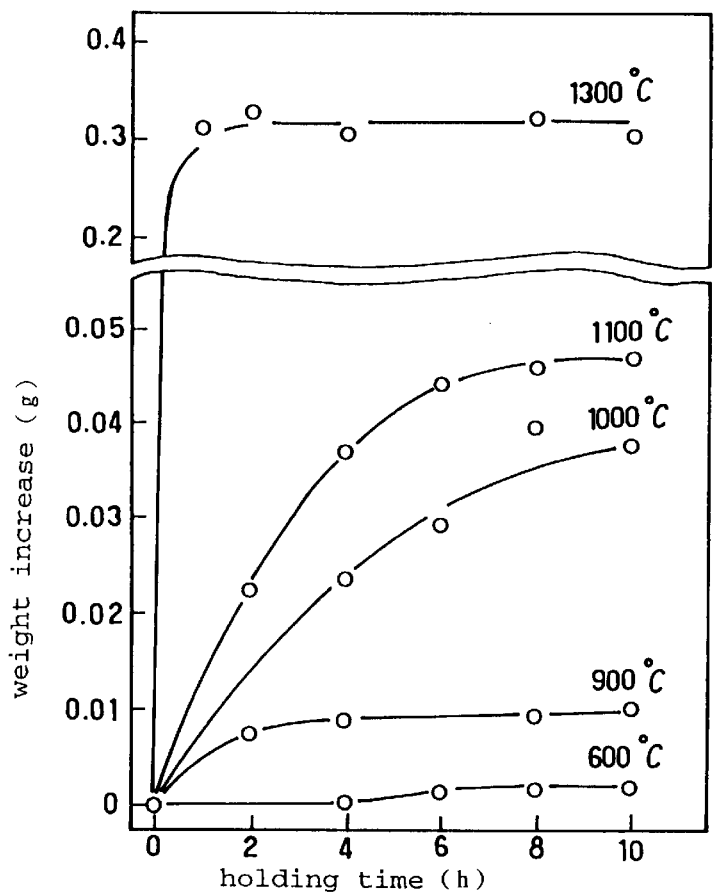
FIG. 21 is a graph showing the relationship between high temperature holding time and weight increase of a sintered body made using an Fe—Cr—Al—REM stainless steel fiber of fiber width 50 μm.

In FIG. 21 the temperatures are holding temperatures, and in the cases wherein the holding temperature was 600° C. and 900° C. the weight increase was less than 0.01 g, meaning that there was little oxidation of the sintered fibers and that they were stable. It was found that when the holding temperature rises to 1000° C. or 1100° C. the weight rapidly increases as the holding time becomes longer and then shows a substantially constant state after holding for about 8 hours. When the holding temperature was 1300° C. it was found that unlike the cases of 1100° C. and 1000° C. there was a sudden weight increase, and the value thereof also was about six times that in the case of 1100° C., and the weight showed a constant value after a short time.

Figure 22:
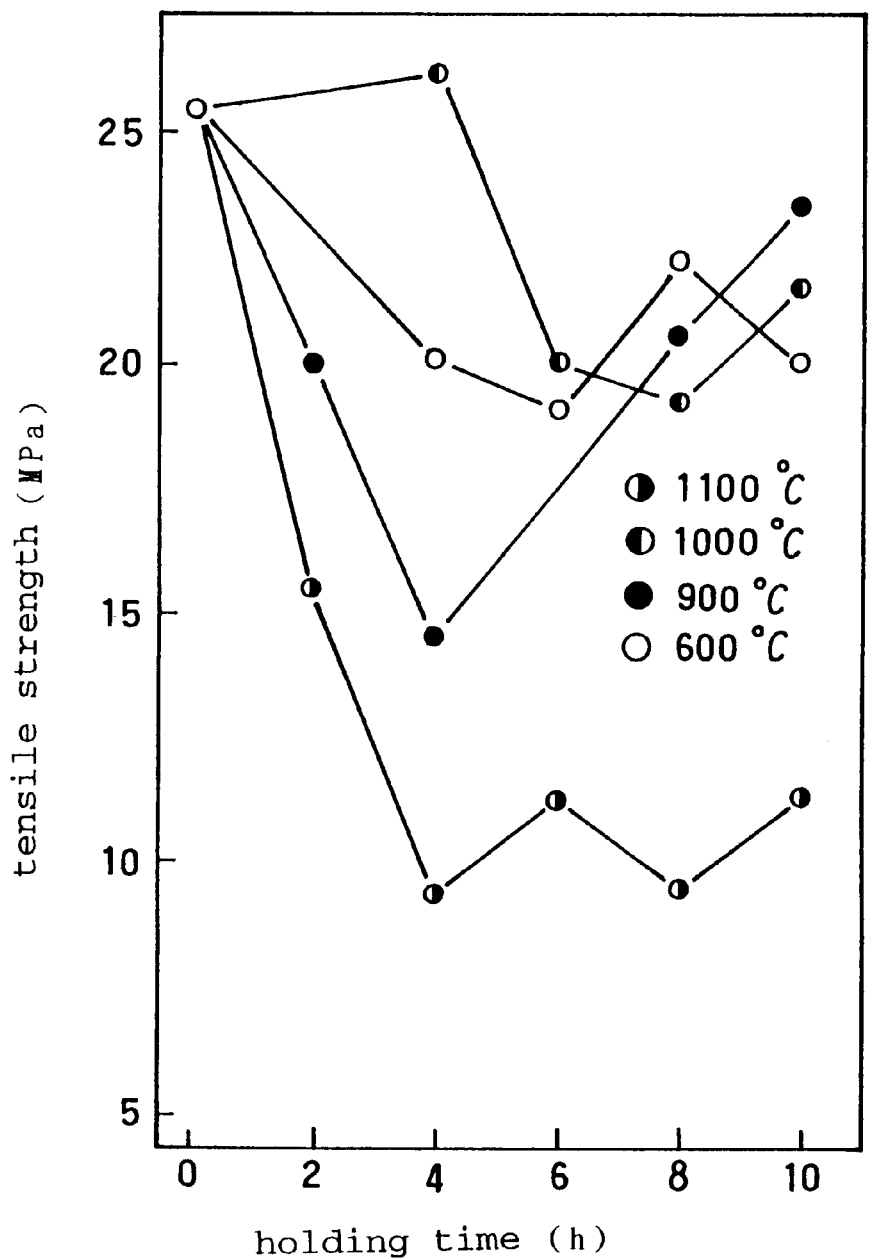
FIG. 22 is a graph showing the relationship between high temperature holding time and tensile strength of a stainless steel fiber sintered body of fiber width 135 μm.

8) Results obtained when test pieces were taken and tensile strength tests were carried out after the heat treatment (with a crosshead speed of 5 mm/min) are shown in FIG. 22.

From these results it can be seen that in the cases wherein the holding temperature was made 600° C., 900° C. and 1000° C. the tensile strengths of the sintered body were in the range 23 MPa to 19 MPa, which is only 3 MPa to 6 MPa less than the tensile strength of the sintered body before the heat treatment, which was 26 MPa, and the sintered body had ample strength.

However, the tensile strength of the test piece in the case of the holding temperature of 1100° C. had fallen to below ½ of that of the sintered body before the heat treatment. A holding temperature of 1300° C. was also tried, but in this case the test piece became markedly brittle and it was not possible to measure its tensile strength. This was because high temperature oxidation of the base material structure was marked, and it is thought that although the base metal in itself is a material having heat resistance at 1100° C. its characteristics changed as a result of its thickness becoming small due to cutting.

9) Results of X-ray analysis of the test pieces after heat treatment were that although the untreated sintered body and the materials heat treated at holding temperatures of 600° C. and 900° C. peaks of the base materials (Fe and Cr) were found, when the treatment temperature was 1100° C. the peaks of the base materials (Fe and Cr) were smaller. At 1100° C. small amounts of what appeared to be oxides of Fe and Al were found, and at 1300° C. there were no peaks of the base materials (Fe and Cr) and oxides of Fe were confirmed.

10) Because the color of the test piece heat treated at 1000° C. had a tinge of white, it was supposed that alumina might have formed on the surface uniformly and thinly. Results obtained when the state of formation of oxides on the specimen surface was analyzed with an EPRM (Electron Probe Micro Analyzer) are shown in FIG. 23-A through FIG. 23-E.

In the case shown in FIG. 23-A of a sintered body which has not been heat treated, Al is evenly present in the base metal. Al can also be seen in the case of a holding temperature of 600° C. (FIG. 23-B), and on the surface of the test piece there was no formation of an alumina film. With a holding temperature of 900° C. (FIG. 23-C), there was slightly less Al in the base metal and alumina had started to form on the test piece surface. With a holding temperature of 1100° C. (FIG. 23-D) it was found that there was almost no Al in the base metal, alumina had formed on the test piece surface and a Cr compound had formed under this, creating a composite oxide film, and the stability of the alumina film was changing. With a holding temperature of 1300° C. (FIG. 23-E) it was found that the whole test piece had oxidized and absolutely no metal parts remained. From this it was concluded that this Fe—Cr—Al—REM stainless steel fiber sintered body shows stability up to 1000° C. in an air atmosphere.

11) Results obtained by measuring the relationship between treating temperature and weight change when a stainless steel fiber sintered body of thickness 1.3 mm manufactured using an Fe—Cr—Al—REM stainless steel long fiber (fiber width 15 μm) manufactured from a thin sheet of sheet thickness 15 μm and with a tool feed speed of 10 μm/rev was oxidized by being treated at a high temperature of 600 to 1300° C. in an air atmosphere for 2 to 10 hours are shown in FIG. 24.

As is clear from FIG. 24, as the temperature rises the weight increase becomes greater and with a fiber sintered body of these dimensions the temperature at which a marked weight increase occurred was 100° C. Compared to 1300° C. in the case of the sintered body made using fibers of fiber width 50 μm, this is about 200° C. less. The reason for this is thought to be that as a result of the fibers being finer the number of fibers and the surface area per unit area of the test piece is greater.

With respect to tensile strength, that of a fiber sintered body of fiber width 15 μm at room temperature was 18 MPa, which is less than in the case of fiber width 50 μm. This is because a fall in apparent tensile strength has appeared due to the porosity increasing.

Therefore, summarizing the above, it is clear that an Fe—Cr—Al—REM stainless steel fiber sintered body according to this invention can maintain stable strength in high temperature air atmospheres of up to 1000° C.

Second Preferred Embodiment

A flat fiber sintered body of thickness 1.3 mm was made using the Fe—Cr—Al—REM stainless steel fiber (fiber width 15 μm) of the first preferred embodiment manufactured from a thin sheet of sheet thickness 15 μm and with a tool feed speed of 10 μm/rev.

This fiber sintered body was shaped by being passed through a pair of toothed rollers of diameter 70 mm with rounded teeth of module 1.5 formed on their surfaces, and a corrugated fiber sintered body with continuous wavy corrugations of the kind shown in FIG. 2 was thereby obtained. The wave height of this fiber sintered body was about 4 mm and the wave pitch was about 2 mm.

When this corrugated fiber sintered body and the flat fiber sintered body were bent to a radius of curvature of 10 mm, whereas cracks formed in the latter fiber sintered body, no cracks formed in the corrugated sintered body whatsoever. Also, without being bent, the sintered bodies were stood vertically with a length direction (the direction perpendicular to the waves in the case of the corrugated sintered body) end at the bottom, restrained at the top and bottom and repeatedly heated 1000 times in an air atmosphere for four minutes at 800° C. (about 70 hours altogether). The result was that there was absolutely no deformation of the corrugated fiber sintered body. On the other hand, a central portion of the flat fiber sintered body had greatly swelled and deformed.

From this result, it can be seen that corrugations in the fibers and corrugations in the sintered body are extremely effective.

What is claimed is:

1. A method of making a metal fiber sintered body comprising the steps of:

a) making a tow of Fe—Cr—Al—La, Fe—Cr—Al—Y or Fe—Cr—Al—Ce continuous fibers by lathe turning an end face of a coiled material at a tool feed speed of from 5 to 40 μm/rev, said coiled material being made by coiling a thin sheet of an Fe—Cr—Al—La, Fe—Cr—Al—Y or Fe—Cr—Al—Ce stainless steel;

b) extending the tow formed in step a) in a width direction thereof and cutting the tow with a roller type cutting assembly to form Fe—Cr—Al—La, Fe—Cr—Al—Y or Fe—Cr—Al—Ce stainless steel fibers having a fiber length of 20 to 200 mm;

c) feeding the Fe—Cr—Al—La, Fe—Cr—Al—Y or Fe—Cr—Al—Ce stainless steel fibers to a conveyor and dropping said stainless steel fibers on the conveyor;

d) dispersing said stainless steel fibers by making an air current act on the stainless steel fibers in a direction intersecting with a direction in which the fibers are being dropped onto the conveyor in step c) to form a sheet-shaped accumulation of the stainless steel fibers on the conveyor;

e) transporting the sheet-shaped accumulation on the conveyor and compressing said sheet-shaped accumulation by means of a pressure roller located at an exit end of the conveyor to form a web; and f) sintering said web;

wherein said stainless steel fibers have a thickness of from 7.5 to 180 μm and comprise from 17 to 21% by weight Cr, from 2.5 to 6.5% by weight Al, from 0.02 to 0.25% by weight of La, Y or Ce as well as iron.

2. The method as defined in claim 1, wherein said roller type cutting assembly has at least three stages of rollers including a first stage, a second stage and a third stage, each of said stages comprising a pair of rollers intersecting with an axial direction of the tow and nipping the tow from the front and rear thereof; and wherein the tow is stretched by rotating the second stage rollers at a faster speed of rotation than the first stage rollers and the tow is forcibly cut by being snapped by rotating the third stage rollers at a faster speed of rotation than the second stage rollers so that a plurality of the Fe—Cr—Al—La, Fe—Cr—Al—Y or Fe—Cr—Al—Ce stainless steel fibers are thereby simultaneously formed, and said Fe—Cr—Al—La, Fe—Cr—Al—Y or Fe—Cr—Al—Ce stainless steel fibers are acted upon and said air current is produced by blowing means disposed between a most downstream roller of said rollers and the conveyor.

3. The method as defined in claim 1, wherein said tool feed speed is from 10 to 40 μm/rev.

4. The method as defined in claim 1, wherein said stainless steel fibers have a width of from 10 to 170 μm.

5. The method as defined in claim 1, wherein said stainless steel fibers comprise up to 0.008% by weight C, up to 1.0% by weight Si, up to 1.0% by weight Mn, from 19.0% to 21.0% by weight of said Cr, from 4.5% to 6.0% by weight of said Al and from 0.06% to 0.12% by weight of said La, Y or Ce.

6. The method as defined in claim 1, wherein said stainless steel fibers are straight.

7. The method as defined in claim 1, wherein said stainless steel fibers are non-straight having wavy corrugations continuing in a fiber length direction.

8. The method as defined in claim 1, wherein said sintered body is plate-shaped and has corrugations in a thickness direction therethrough.

9. A method of making a metal fiber sintered body comprising the steps of:

a) making a tow of Fe—Cr—Al—La, Fe—Cr—Al—Y or Fe—Cr—Al—Ce continuous fibers by lathe turning an end face of a coiled material at a tool feed speed of from 5 to 40 μm/rev, said coiled material being made by coiling a thin sheet of an Fe—Cr—Al—La, Fe—Cr—Al—Y or Fe—Cr—Al—Ce stainless steel;

b) extending the tow in a width direction formed in step a) and cutting the tow with at least two roller type cutting assemblies to form Fe—Cr—Al—La, Fe—Cr—Al—Y or Fe—Cr—Al—Ce stainless steel fibers having a fiber length of 20 to 200 mm;

c) feeding the Fe—Cr—Al—La, Fe—Cr—Al—Y or Fe—Cr—Al—Ce stainless steel fibers to a conveyor and dropping said stainless steel fibers on the conveyor;

d) dispersing said stainless steel fibers by making an air current act on the stainless steel fibers in a direction intersecting with a direction in which the fibers are being dropped onto the conveyor in step c) to form a sheet-shaped accumulation of the stainless steel fibers on the conveyor;

e) transporting the sheet-shaped accumulation on the conveyor and compressing said sheet-shaped accumulation by means of a pressure roller located at an exit end of the conveyor to form a web; and f) sintering said web;

wherein said stainless steel fibers have a thickness of from 7.5 to 180 μm and comprise from 17 to 21% by weight Cr, from 2.5 to 6.5% by weight Al, from 0.02 to 0.25% by weight of La, Y or Ce as well as iron.

10. The method as defined in claim 9, wherein the at least two roller type cutting assemblies are disposed in series in a movement direction of the conveyor and a predetermined number of tows of Fe—Cr—Al—La, Fe—Cr—Al—Y or Fe—Cr—Al—Ce stainless steel fibers are fed into each of the at least two roller type cutting assemblies and cut by being snapped so that on top of the sheet-shaped accumulation farthest upstream on the conveyor are scattered and accumulated Fe—Cr—Al—La, Fe—Cr—Al—Y or Fe—Cr—Al—Ce stainless steel fibers from one of the at least two roller type cutting assemblies downstream of that.

11. The method as defined in claim 10, wherein each of said at least two roller type cutting assemblies has at least three stages of rollers including a first stage, a second stage and a third stage, each of said stages comprising a pair of said rollers intersecting with an axial direction of the tow and nipping the tow from the front and the rear thereof; and the tow is stretched by the second stage rollers rotated at a faster speed of rotation than that of the first stage rollers and the tow is forcibly cut by being snapped by the third stage rollers being rotated at a faster speed of rotation than the second stage rollers and a plurality of said Fe—Cr—Al—La, Fe—Cr—Al—Y or Fe—Cr—Al—Ce stainless steel fibers are acted on by an air current from a direction intersecting with a direction in which said stainless steel fibers are dropped on the conveyor by means of a blowing means disposed between the most downstream roller and the conveyor.

12. The method as defined in claim 11, wherein at least the second stage rollers and the third stage rollers are toothed rollers.

* * * * *